United States Patent
Oshima et al.

(10) Patent No.: US 7,858,708 B2
(45) Date of Patent: Dec. 28, 2010

(54) PROPYLENE-ETHYLENE-BUTENE BLOCK COPOLYMER AND MOLDED ARTICLE THEREOF

(75) Inventors: Hideki Oshima, Bartlesville, OK (US); Takashi Sanada, Ichihara (JP); Kazuki Wakamatsu, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 460 days.

(21) Appl. No.: 12/064,647

(22) PCT Filed: Aug. 29, 2006

(86) PCT No.: PCT/JP2006/317404

§ 371 (c)(1), (2), (4) Date: Mar. 20, 2008

(87) PCT Pub. No.: WO2007/026912

PCT Pub. Date: Mar. 8, 2007

(65) Prior Publication Data

US 2010/0197865 A1    Aug. 5, 2010

(30) Foreign Application Priority Data

Aug. 30, 2005    (JP) .............................. 2005-248848

(51) Int. Cl.
C08F 255/04 (2006.01)
C08F 255/02 (2006.01)
(52) U.S. Cl. ................................................. 525/323
(58) Field of Classification Search ............... 525/323
See application file for complete search history.

(56) References Cited

U.S. PATENT DOCUMENTS 5,326,639 A    7/1994    Leonard et al.
5,840,808 A *  11/1998   Sugimura et al. ........... 525/268

FOREIGN PATENT DOCUMENTS

| CN | 1051183 A | 5/1991 |
|---|---|---|
| JP | 60-28411 A | 2/1985 |
| JP | 60-96612 A | 5/1985 |
| JP | 61-95017 A | 5/1986 |
| JP | 61-120834 A | 6/1986 |
| JP | 61-152442 A | 7/1986 |
| JP | 3-97747 A | 4/1991 |
| JP | 8-208737 A | 8/1996 |
| JP | 2003-2939 A | 1/2003 |
| WO | WO 95/27741 A1 | 10/1995 |

* cited by examiner

*Primary Examiner*—Jeffrey C Mullis
(74) *Attorney, Agent, or Firm*—Sughrue Mion, PLLC

(57) ABSTRACT

A propylene-ethylene-butene block copolymer is provided which includes from 60 to 85% by weight of a polypropylene portion and from 15 to 40% by weight of a propylene-ethylene-butene random copolymer portion, wherein the copolymer satisfies the requirements (1) and (2) given below. In addition, a molded article including such a propylene-ethylene-butene block copolymer is provided.

(1) The random copolymer portion includes a propylene-ethylene random copolymer component (EP) and a propylene-ethylene-butene random copolymer component (EPB) and the copolymer component (EP) has an intrinsic viscosity of from 1.5 to 8 dl/g and an ethylene unit content of from 20 to 50% by weight, and the copolymer component (EPB) has an intrinsic viscosity of from 0.5 to 8 dl/g, an ethylene unit content of from 47 to 77% by weight and a butene unit component of from 3 to 33% by weight and the total of the ethylene unit content and the butene unit content is from 50 to 80% by weight.

(2): The propylene-ethylene-butene block copolymer has a melt flow rate of from 5 to 120 g/10 min.

5 Claims, No Drawings

PROPYLENE-ETHYLENE-BUTENE BLOCK COPOLYMER AND MOLDED ARTICLE THEREOF

TECHNICAL FIELD

The present invention relates to propylene-ethylene-butene block copolymers and molded articles thereof. Particularly, the invention relates to propylene-ethylene-butene block copolymers excellent in stiffness and impact strength, and to molded articles thereof.

BACKGROUND ART

Polypropylene, in particular, propylene-ethylene block copolymer is widely used in applications where stiffness and impact resistance are required, such as automotive interior or exterior materials and components of electric products.

For example, JP-A 7-109316 discloses, for the purpose of improving processability, appearance, flexural modulus, surface hardness, impact resistance and paintability, a thermoplastic polymer prepared by a process having a step of producing a homopolymer of propylene, a step of producing an ethylene-propylene copolymer at an ethylene/propylene reaction ratio of from 30/70 to 50/50, a step of producing an ethylene-propylene copolymer at an ethylene/propylene reaction ratio of from 90/10 to 70/30 and a step of producing an ethylene-butene copolymer.

JP-A 2001-123038 discloses, for the purpose of improving see-through property, a propylene-based block copolymer composition comprising an ethylene-propylene random copolymer having an ethylene content of from 0.1 to 5% by weight and an ethylene-propylene-butene random copolymer.

JP-A 2003-327642 discloses, for the purpose of improving stiffness, hardness and moldability and also improving balance between toughness and impact resistance at low temperatures, a propylene-ethylene block copolymer comprising a polypropylene portion and a propylene-ethylene random copolymer portion composed of a propylene-ethylene random copolymer having an ethylene content of not less than 20% by weight but less than 50% by weight and a propylene-ethylene random copolymer having an ethylene content of not less than 50% by weight but less than 80% by weight.

JP-A 2004-217896 discloses a polypropylene-based resin composition containing, for improvement in gloss and linear expansion coefficient of the polypropylene-based resin composition, a component prepared by producing a polypropylene, an ethylene-propylene copolymer and an ethylene-butene copolymer by continuous multi-stage polymerization.

However, such conventional polypropylene-based thermoplastic materials have been desired to be further improved in stiffness and impact strength.

Therefore, the objective of the present invention is to propylene-ethylene block copolymers excellent in stiffness and impact strength and to provide molded articles thereof.

DISCLOSURE OF THE INVENTION

The present invention relates to a propylene-ethylene-butene block copolymer comprising from 60 to 85% by weight, based on the amount of the propylene-ethylene-butene block copolymer, of a polypropylene portion which is a propylene homopolymer or a copolymer of propylene with 1 mol % or less of at least one comonomer selected from the group consisting of ethylene and α-olefins having 4 or more carbon atoms, and from 15 to 40% by weight, based on the amount of the propylene-ethylene-butene block copolymer, of a propylene-ethylene-butene random copolymer portion having a weight ratio of propylene units to ethylene units of from 35/65 to 75/25, wherein the propylene-ethylene-butene block copolymer satisfies the requirements (1) and (2) provided below, and the invention also relates to a molded article thereof;

requirement (1): the propylene-ethylene-butene random copolymer portion comprises a propylene-ethylene random copolymer component (EP) and a propylene-ethylene-butene random copolymer component (EPB), the copolymer component (EP) having an intrinsic viscosity $[\eta]_{EP}$ of from 1.5 to 8 dl/g and an ethylene unit content $[(C2')_{EP}]$ of from 20 to 50% by weight, and the copolymer component (EPB) having an intrinsic viscosity $[\eta]_{EPB}$ of from 0.5 to 8 dl/g, an ethylene unit content $[(C2')_{EPB}]$ of from 47 to 77% by weight, a butene unit component $[(C4')_{EPB}]$ of from 3 to 33% by weight, and a total of the ethylene unit content $[(C'2)_{EPB}]$ and the butene unit content $[(C4')_{EPB}]$ being from 50 to 80% by weight;

requirement (2): the propylene-ethylene-butene block copolymer has a melt flow rate of from 5 to 120 g/10 min.

According to the present invention, it is possible to obtain propylene-ethylene-butene block copolymers excellent in stiffness and impact strength and molded articles thereof.

BEST MODE FOR CARRYING OUT THE INVENTION

The propylene-ethylene-butene block copolymer of the present invention includes from 60 to 85% by weight, based on the amount of the propylene-ethylene-butene block copolymer, of a polypropylene portion which is a propylene homopolymer or a copolymer of propylene with 1 mol % or less of at least one comonomer selected from the group consisting of ethylene and α-olefins having 4 or more carbon atoms, and from 15 to 40% by weight, based on the amount of the propylene-ethylene-butene block copolymer, of a propylene-ethylene-butene random copolymer portion having a weight ratio of propylene units to ethylene units of from 35/65 to 75/25.

When the content of the polypropylene portion is less than 60% by weight, the stiffness or hardness may be deteriorated or sufficient moldability may not be obtained due to decrease in fluidity in a molten state. When the content of the polypropylene portion exceeds 85% by weight, the toughness or impact resistance may be deteriorated.

The polypropylene portion included in the propylene-ethylene-butene block copolymer of the present invention is a polypropylene which is a propylene homopolymer or a copolymer of propylene with 1 mol % or less of at least one comonomer selected from the group consisting of ethylene and α-olefins having 4 or more carbon atoms. The term "comonomer" as used herein refers to monomers other than propylene constituting the copolymer. The amount of monomer expressed by "1 mol % or less" means the ratio of the number of the structural units derived from the comonomers to the total number of the structural units constituting the copolymer.

Examples of the α-olefins having 4 or more carbon atoms include 1-butene, 1-hexene, 4-methyl-1-pentene, 1-octene, 1-decene, 1-tetradecene, and 1-octadecene. Preferable examples are α-olefins having from 3 to 8 carbon atoms, specific examples of which include 1-butene, 1-hexene, 4-methyl-1-pentene, and 1-octene. Particularly preferable α-olefins are 1-butene and 1-hexene. If the content of the comonomers exceeds 1 mol %, the stiffness, heat resistance or hardness may be deteriorated.

From the viewpoint of stiffness, heat resistance or hardness, the polypropylene portion included in the propylene-ethylene-butene block copolymer of the present invention is preferably a propylene homopolymer, and particularly preferably is a propylene homopolymer having an isotactic pentad fraction, as calculated by $^{13}$C-NMR, of from 0.95 to 1. The isotactic pentad fraction is a fraction of propylene monomer units which are present at the center of an isotactic chain in the form of a pentad unit, in other words, the center of a chain in which five propylene monomer units are meso-bonded successively, in the polypropylene molecular chain as measured by a method reported in A. Zambelli et al., Macromolecules, 6, 925 (1973), namely, by use of $^{13}$C-NMR. It is noted that NMR absorption peaks are assigned according to the disclosure of Macromolecules, 8, 687 (1975). Specifically, the isotactic pentad fraction is measured as an area fraction of mmmm peaks in the entire peak area of methyl carbon ranges of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, Great Britain was measured to be 0.944.

From the viewpoint of fluidity in a molten state, the polypropylene portion included in the propylene-ethylene-butene block copolymer of the present invention preferably has an intrinsic viscosity $[\eta]_P$ of 1.5 dl/g or less, and particularly preferably from 0.7 dl/g to 1.5 dl/g. The molecular weight distribution of the polypropylene portion, as determined by gel permeation chromatography (GPC), preferably is not less than 3 but less than 7, and more preferably from 3 to 5. The "molecular weight distribution" may be expressed as "Q value" or "Mw/Mn" in the art. Mw and Mn are a weight average molecular weight and a number average molecular weight, respectively, determined by GPC. Therefore, the molecular weight distribution is the ratio of the weight average molecular weight to the number average molecular weight as determined by GPC. In the present invention, the GPC measurement is conducted under the conditions given below and the "molecular weight distribution" is determined using a calibration curve produced by use of standard polystyrenes.

Measuring temperature: 140° C.
Solvent: o-Dichlorobenzene

The weight ratio of the propylene units to the ethylene units in the propylene-ethylene-butene random copolymer portion contained in the propylene-ethylene-butene block copolymer of the present invention is from 35/65 to 75/25. If the weight ratio of the propylene units to the ethylene units is out of this range, sufficient impact resistance may not be obtained. The weight ratio of the propylene units to the ethylene units is preferably within the range of from 40/60 to 70/30.

The propylene-ethylene-butene random copolymer portion contained in the propylene-ethylene-butene block copolymer of the present invention comprises a propylene-ethylene random copolymer component (EP) and a propylene-ethylene-butene random copolymer component (EPB), and it is preferably composed of a propylene-ethylene random copolymer component (EP) and a propylene-ethylene-butene random copolymer component (EPB).

The propylene-ethylene random copolymer component (EP) has an ethylene unit content $[(C2')_{EP}]$ of from 20 to 50% by weight. If the ethylene unit content $[(C2')_{EP}]$ is out of this range, the impact resistance may be deteriorated. The ethylene unit content $[(C2')_{EP}]$ is preferably from 25 to 45% by weight, wherein the ethylene unit content $[(C2')_{EP}]$ is based on the weight of the propylene-ethylene random copolymer component (EP).

The propylene-ethylene random copolymer component (EP) has an intrinsic viscosity $[\eta]_{EP}$ of from 1.5 to 8 dl/g, and preferably from 2 to 8 dl/g. If the intrinsic viscosity $[\eta]_{EP}$ is less than 1.5 dl/g, the stiffness or hardness may be reduced or the impact resistance also may be reduced. If the intrinsic viscosity $[\eta]_{EP}$ is greater than 8 dl/g, many hard spots may be formed in molded articles. When much propylene-ethylene-butene random copolymer portion is contained, specifically, when the content of the propylene-ethylene-butene random copolymer portion is greater than 40% by weight of the amount of the propylene-ethylene-butene block copolymer, the block copolymer may exhibit a reduced fluidity.

The propylene-ethylene-butene random copolymer component (EPB) has an ethylene unit content $[(C2')_{EPB}]$ of from 47 to 77% by weight. If the ethylene content $[(C2')_{EPB}]$ is out of this range, the impact resistance at low temperatures may be deteriorated. The ethylene unit content $[(C2')_{EPB}]$ is preferably from 52 to 72% by weight, and more preferably from 55 to 75% by weight. The ethylene unit content $[(C2')_{EP}]$ is based on the weight of the propylene-ethylene-butene random copolymer component (EPB).

The propylene-ethylene-butene random copolymer component (EPB) has a butene unit content $[(C4')_{EPB}]$ of from 3 to 33% by weight, and preferably from 3 to 25% by weight. If the butene unit content $[(C4')_{EPB}]$ is less than 3% by weight, the impact resistance may be deteriorated. It may be difficult to produce a propylene-ethylene-butene block copolymer having a butene unit content $[(C4')_{EPB}]$ of greater than 33% by weight.

The total of the ethylene unit content $[(C'2)_{EPB}]$ and the butene unit content $[(C4')_{EPB}]$ of the propylene-ethylene-butene random copolymer component (EPB) is from 50 to 80% by weight, and preferably from 55 to 70% by weight.

The propylene-ethylene-butene random copolymer component (EPB) has an intrinsic viscosity $[\eta]_{EPB}$ of from 0.5 to 8 dl/g, and preferably from 1 to 8 dl/g. If the intrinsic viscosity $[\eta]_{EPB}$ is less than 0.5 dl/g, the stiffness or hardness may be deteriorated or the impact resistance may also be deteriorated. If the intrinsic viscosity $[\eta]_{EPB}$ exceeds 8 dl/g, the impact resistance may be reduced. When much propylene-ethylene-butene random copolymer portion is contained, specifically, when the content of the propylene-ethylene-butene random copolymer portion is greater than 40% by weight of the amount of the propylene-ethylene-butene block copolymer, the block copolymer may exhibit a reduced fluidity. From the viewpoint of toughness or appearance, the intrinsic viscosity $[\eta]_{EPB}$ of the copolymer component (EP) and the intrinsic viscosity $[\eta]_{EPB}$ of the copolymer portion (EPB) preferably satisfy a relationship $[\eta]_{EP} \geq [\eta]_{EPB}$.

The ethylene unit content $(C2'_{(T)})$ and the butene unit content $(C4'_{(T)})$ of a propylene-ethylene-butene copolymer can be determined by NMR analysis, which is disclosed in detail in the Example section.

The content of the propylene-ethylene random copolymer component (EP) and the content of the propylene-ethylene-butene random copolymer component (EPB) in a propylene-ethylene butene block copolymer can be determined by calorimetric analysis using DSC in which a polymer composed of the polypropylene portion of the propylene-ethylene-butene block copolymer, which polymer can be obtained by preparing the polypropylene portion and then sampling, a polymer composed of the polypropylene portion and the copolymer component (EP), which polymer can be obtained by preparing the polypropylene portion and the copolymer component (EP) and then sampling, and the propylene-ethylene-butene block copolymer, respectively. The content of the propylene-ethylene random copolymer component (EP) or the propylene-ethylene-butene random copolymer component (EPB) can be determined also based on the amounts of elements (e.g., magnesium and silicon) which were contained in the polymerization catalyst and which remain in the polymer. Specifically, the content of the copolymer component (EP) and the content of the copolymer component (EPB) can be determined by quantitatively determining the contents of the catalyst-derived specified elements contained in the polymer composed of the polypropylene portion of the propylene-ethylene-butene block copolymer, which polymer can be obtained by preparing the polypropylene portion and then sampling, the polymer composed of the polypropylene portion and the copolymer component (EP), which polymer can be obtained by preparing the polypropylene portion and the copolymer component (EP) and then sampling, and the propylene-ethylene-butene block copolymer.

The ethylene unit contents $[(C2')_{EP}]$, $[(C2')_{EPB}]$, and the butene unit content $[(C4')_{EPB}]$ can be determined based on the ethylene unit content and the butene unit content, determined by NMR analysis, of the polymer composed of the polypropylene portion of the propylene-ethylene-butene block copolymer, which can be obtained by preparing the polypropylene portion and then sampling, the polymer composed of the polypropylene portion and the copolymer component (EP), which can be obtained by preparing the polypropylene portion and the copolymer component (EP) and then sampling, and the propylene-ethylene-butene block copolymer, and on the contents of the propylene-ethylene random copolymer component (EP) and the propylene-ethylene-butene random copolymer component (EPB) of the propylene-ethylene-butene block copolymer.

The propylene-ethylene-butene block copolymer of the present invention has a melt flow rate (henceforth, MFR) of from 5 to 120 g/10 min, and preferably from 10 to 100 g/10 min. When the MFR is less than 5 g/10 min, the moldability may deteriorate or the effect of preventing the occurrence of flow marks may be insufficient; whereas when it is greater than 120 g/10 min, the impact resistance may be reduced. The MFR of the propylene-ethylene block copolymer is measured at a measuring temperature of 230° C. and a load of 2.16 kgf in accordance with the method provided in JIS K6758.

The propylene-ethylene-butene block copolymer of the present invention can be produced by conventionally known processes using conventionally known polymerization catalysts and conventionally known polymerization methods.

Examples of polymerization catalysts which can be used include catalyst systems composed of (a) solid catalyst component including magnesium, titanium, halogen and an electron donor as essential components, (b) an organoaluminum compound and (c) electron donating component. Methods for preparing such catalysts are disclosed in detail in JP-A 1-319508, JP-A 7-216017, JP-A 10-212319, JP-A 2004-182876, etc.

Examples of polymerization methods which can be used include bulk polymerization, solution polymerization, slurry polymerization, and vapor phase polymerization. These polymerization methods may be conducted either in a batch system or in a continuous system. Any combination thereof is also available.

More concrete examples of such production processes include the processes conducted by use of a polymerization apparatus including at least three polymerization vessels arranged in series, in the presence of an aforesaid catalyst system composed of (a) a solid catalyst component, (B) an organoaluminium compound and (c) an electron donating component as shown below:

(1) a polymerization process in which a polypropylene portion is produced, the polypropylene portion is then transferred to the next polymerization vessel and a propylene-ethylene-butene random copolymer component (EPB) is produced in the polymerization vessel, the copolymer component (EPB) and the aforesaid polypropylene portion are subsequently transferred to the next polymerization vessel and a propylene-ethylene random copolymer component (EP) is produced in the polymerization vessel continuously;

(2) a polymerization process in which a polypropylene portion is produced, the polypropylene portion is then transferred to the next polymerization vessel and a propylene-ethylene random copolymer component (EP) is produced in the polymerization vessel, the copolymer component (EP) and the aforesaid polypropylene portion are subsequently transferred to the next polymerization vessel and a propylene-ethylene-butene random copolymer component (EPB) is produced in the polymerization vessel continuously.

From industrial and economic points of view, continuous vapor phase polymerization is preferred.

By changing the polymerization time for producing the polypropylene portion, the time for copolymerizing propylene, ethylene and butene, and the time for copolymerizing propylene and ethylene, it is possible to change the ratios of the polypropylene portion, the propylene-ethylene-butene random copolymer component (EP), and the propylene-ethylene-butene random copolymer component (EPB).

Further, it is possible to change the composition of the propylene-ethylene-butene random copolymer component (EPB) by changing the gas composition of a mixed gas of ethylene, propylene, butene and hydrogen used in the production of the propylene-ethylene-butene random copolymer component (EPB). Similarly, it is possible to change the composition of the propylene-ethylene random copolymer component (EP) by changing the gas composition of a mixed gas of ethylene, propylene and hydrogen used in the production of the propylene-ethylene random copolymer component (EP). Hydrogen is added, as a molecular weight regulator, to the polymerization reaction system.

The amount of (a) the solid catalyst component, (b) the organoaluminum compound and (c) the electron donating component used in the aforementioned polymerization processes and the method for feeding the catalyst components into polymerization vessels may be determined appropriately.

The polymerization temperature is typically from −30 to 300° C., and preferably from 20 to 180° C. The polymerization pressure is typically from normal pressure to 10 MPa, and preferably from 0.2 to 5 MPa.

In the production of the propylene-ethylene-butene block copolymer of the present invention, preliminary polymerization may be conducted prior to the polymerization (main polymerization). One example of the method of the preliminary polymerization is a method which is carried out in a slurry state using a solvent while feeding a small amount of propylene in the presence of (a) a solid catalyst component and (b) an organoaluminum compound.

In use of the propylene-ethylene-butene block copolymer of the present invention, other macromolecular materials and various additives may be added to the block copolymer of the present invention.

Examples of such macromolecular materials include elastomers. Examples of the additives include antioxidants, UV absorbers, inorganic fillers and organic fillers.

The propylene-ethylene-butene block copolymer of the present invention can be fabricated into molded articles by appropriate molding techniques. It is particularly suitable for injection molding. Preferable examples of injection molded articles to be obtained from the propylene-ethylene-butene block copolymer of the present invention include automotive components, such as door trims, pillars, instrument panels and bumpers.

EXAMPLES

The present invention is described below with reference to examples.

Methods for measuring physical properties of polymers used in Examples are described below.

(1) Intrinsic Viscosity (Unit: dl/g)

Reduced viscosities were measured at three concentrations of 0.1, 0.2 and 0.5 g/dl using a Ubbelohde's viscometer. The measurement was carried out at a temperature of 135° C. using Tetralin as solvent. The intrinsic viscosities were calculated by a calculation method described in "Kobunshi Yoeki (Polymer Solution), Kobunshi Jikkengaku (Study of Polymer Experiment) Vol. 11" page 491 (published by Kyoritsu Shuppan Co., Ltd., 1982), namely, by an extrapolation method including plotting reduced viscosities against concentrations and extrapolating the concentration in zero.

(1-1) Intrinsic Viscosity of Propylene-Ethylene-Butene Block Copolymer (1-1a) Intrinsic Viscosity of Polypropylene Portion: $[\eta]_P$ The intrinsic viscosity $[\eta]_P$ of a polypropylene portion was determined by the method described in (1) above using some polymer powder sampled from a polymerization vessel just after the polymerization reaction for generating the polypropylene portion.

(1-1b) Intrinsic Viscosity of Propylene-Ethylene-Butene Random Copolymer: $[\eta]_{EPT}$ The intrinsic viscosity of a polypropylene portion, $[\eta]_P$, and the intrinsic viscosity of the entire portion of a propylene-ethylene-butene block copolymer, $[\eta]_T$, were measured, respectively, by the method described in (1) above. Then, the intrinsic viscosity of a propylene-ethylene-butene random copolymer portion: $[\eta]_{EPT}$ was determined from the equation provided below by use of a weight ratio X of the propylene-ethylene-butene random copolymer portion to the propylene-ethylene-butene block copolymer. The weight ratio X was determined by the measuring method (2) described below:

$$[\eta]_{EPT}=[\eta]_T/X-(1/X-1)[\eta]_P,$$

$[\eta]_P$: the intrinsic viscosity (dl/g) of the polypropylene portion, $[\eta]_T$: the intrinsic viscosity (dl/g) of the entire portion of the propylene-ethylene-butene block copolymer.

When the propylene-ethylene-butene random copolymer portion is a propylene-ethylene-butene random copolymer obtained by two-stage polymerization composed of a propylene-ethylene-butene random copolymer component (EPB) and a propylene-ethylene random copolymer component (EP), the intrinsic viscosity $[\eta]_{EP-1}$ of the copolymer component (EP-1) produced in the 1st stage, the intrinsic viscosity $[\eta]_{EP-2}$ of the copolymer component (EP-2) produced in the 2nd stage and the intrinsic viscosity $[\eta]_{EPT}$ of the propylene-ethylene-butene random copolymer portion including the copolymer component (EP-1) and the copolymer component (EP-2) were determined by the following methods, respectively.

1) $[\eta]_{EP-1}$

After producing a copolymer component (EP-1) in the 1st stage, the intrinsic viscosity $([\eta]_{(1)})$ of a sample taken from the polymerization vessel, and then the intrinsic viscosity $[\eta]_{EP-1}$ of the copolymer component (EP-1) of the 1st stage was determined in the same way as (1-1b) above.

$$[\eta]_{EP-1}=[\eta]_{(1)}/X_{(1)}-(1/X_{(1)}-1)[\eta]_P,$$

$[\eta]_P$: the intrinsic viscosity (dl/g) of a polypropylene portion, $[\eta]_{(1)}$: the intrinsic viscosity (dl/g) of the entire portion of an intermediate block copolymer after the preparation of the copolymer component (EP-1), $X_{(1)}$: the weight ratio of the copolymer component (EP-1) to the entire portion of the intermediate block copolymer after the preparation of the copolymer component (EP-1).

2) $[\eta]_{EPT}$

The intrinsic viscosity $[\eta]_{EPT}$ of a propylene-ethylene-butene random copolymer including the copolymer components (EP-1) and (EP-2) was determined in the same way as (1-1b) above:

$$[\eta]_{EPT}=[\eta]_T/X-(1/X-1)[\eta]_P,$$

$[\eta]_P$: the intrinsic viscosity (dl/g) of a polypropylene portion, $[\eta]_T$: the intrinsic viscosity (dl/g) of the entire portion of the propylene-ethylene-butene block copolymer, X: the weight ratio of the propylene-ethylene-butene random copolymer portion to the entire portion of the propylene-ethylene-butene block copolymer.

3) $[\eta]_{EP-2}$

The intrinsic viscosity $[\eta]_{EP-2}$ of a copolymer component (EP-2) produced in the 2nd stage was determined from the intrinsic viscosity $[\eta]_P$ of a propylene-ethylene-butene random copolymer portion, the intrinsic viscosity $[\eta]_{EP-1}$ of a copolymer component (EP-1) of the 1st stage, and their weight ratios:

$$[\eta]_{EP-2}=([\eta]_{EP}\times X-[\eta]_{EP-1}\times X_1)/X_2,$$

$X_1$: the weight ratio of the copolymer component (EP-1) to the entire portion of the propylene-ethylene-butene block copolymer, $$X_1=(X_{(1)}-X\times X_{(1)})/(1-X_{(1)}),$$

$X_2$: the weight ratio to a copolymer component (EP-2) to the entire portion of a propylene-ethylene-butene block copolymer, $$X_2=X-X_1.$$

(2) Weight Ratio $X_{(EP)}$ of Propylene-Ethylene Random Copolymer Portion and Weight Ratio $X_{(EPB)}$ of Propylene-Ethylene-Butene Copolymer Portion to the Entire Portion of a Propylene-Ethylene-Butene Block Copolymer The weight ratio $X_{(EP)}$ of a propylene-ethylene random copolymer portion and the weight ratio $X_{(EPB)}$ of a propylene-ethylene-butene copolymer portion to the entire portion of a propylene-ethylene-butene block copolymer were calculated by the following methods, respectively:

$$X_{(EP)}=Mg_{(T)}\times(1/Mg_{(EP)}-1/Mg_{(P)})$$

$$X_{(EPB)}=1-Mg_{(T)}/Mg_{(EP)}$$

where, $Mg_{(P)}$: the magnesium content of the polymer powder taken out from the polymerization vessel after the generation of the polypropylene portion in the production of the propylene-ethylene-butene block copolymer, $Mg_{(EP)}$: the magnesium content of the polymer powder taken out from the polymerization vessel after the generation of the polypropylene portion and the propylene-ethylene copolymer component (EP) in the production of the propylene-ethylene-butene block copolymer, and $Mg_{(T)}$: the magnesium content of the propylene-ethylene-butene block copolymer powder.

The magnesium contents in the polymer powders were determined by charging a polymer powder into an aqueous sulfuric acid solution (1 mol/l), followed by extraction of metal components using ultrasonic waves, and then analyzing the resulting liquid portion by ICP atomic emission spectrometry.

(3) Ethylene Unit Content $[(C2')_{EP}]$ of propylene-ethylene Random Copolymer Portion Included in Propylene-Ethylene-Butene Block Copolymer The ethylene unit content was determined using a $^{13}$C-NMR spectrum measured under the conditions given below according to the report of Kakugo, et al. (Macromolecules, 15, 1150-1152 (1982)). In a test tube having a diameter of 10 mmF, about 200 mg of a polymer which had been taken out from the polymerization vessel after the generation of a propylene-ethylene copolymer portion during the production of a block copolymer was dissolved uniformly in 3 ml of o-dichlorobenzene to yield a sample. The $^{13}$C-NMR spectrum of the sample was measured under the following conditions:

measurement temperature: 135° C.,
pulse repeating time: 10 seconds,
pulse width: 45°, and
the number of integration: 2500.

(4) Ethylene Unit Content $[(C2')_{EPB}]$ and Butene Unit Content $[(C4')_{EPB}]$ of Propylene-Ethylene-Butene Random Copolymer Component (EPB) Contained in Propylene-Ethylene-Butene Block Copolymer The ethylene unit content $(C2'_{(T)})$ and the butene unit content $(C4'_{(T)})$ of a propylene-ethylene-butene copolymer were determined on the basis of the assignment of NMR absorption peaks disclosed in Journal of Polymer Science, Part A, Polymer Chemistry, 28, 1237-1254, 1990.

Next, the ethylene unit content $[(C2')_{EPB}]$ and the butene unit content $[(C4')_{EPB}]$ of the propylene-ethylene-butene random copolymer component (EPB) were calculated from $X_{(EP)}$, $X_{(EPB)}$, $[(C2')_{EP}]$ determined in (2) and (3) above and the ethylene unit content $(C2'_{(T)}')$ in the propylene-ethylene-butene block copolymer:

$$[(C2')_{EPB}]=((C2'_{(T)})/(X_{(EP)}+X_{(EPB)})-[(C2')_{EP}]\times(X_{(EP)}+X_{(EPB)})/X_{(EP)})/X_{(EPB)}$$

$$[(C4')_{EPB}]=(C4'_{(T)})/X_{(EPB)}$$

(5) Flexural Modulus (FM) (Unit: MPa)

The flexural modulus was measured in accordance with the method provided in JIS K7106. The measurement was conducted at 23° C. using a specimen (3 mm in thickness) produced by hot press molding at 230° C.

(6) IZOD Impact Strength (Unit: kJ/m$^2$)

The IZOD impact strength is measured in accordance with the method provided in JIS K7110. An impact strength was measured using a specimen (5 mm in thickness) produced by hot press molding at 230° C., followed by notching. The Measurement was conducted at 23° C. and −30° C.

(7) MFR (Unit: g/10 min)

The MFR is measured according to the method provided in JIS K6758. The measurement was carried out at a measuring temperature of 230° C. and a load of 2.16 kgf, unless otherwise stated.

[Preparation of Solid Catalyst Component]

A solid catalyst component for use in the preparation of a propylene-ethylene-butene block copolymer of the present invention was prepared in the same way as Example 3(1), (2) of JP-A 2004-182876.

[Production of Propylene-Ethylene-Butene Block Copolymer (BCPP1)]

[1st Stage]

Into a stainless autoclave having a capacity of 3 liters, the inside of which had been vacuumed, 4.4 mmol of triethyl aluminum, 0.44 mmol of tert-butyl-n-propyldimethoxysilane and 13.0 mg of the above-mentioned solid catalyst component were charged, and then 780 g of liquid propylene and 1.0 MPa of hydrogen were fed. Polymerization was initiated by increasing the temperature in the autoclave to 80° C. Ten minutes later, the liquid component was purged. After the purging, the gaseous component in the autoclave was replaced by argon. 5.2 g of powder was sampled from the autoclave and then analyzed.

[2nd Stage]

After the sampling, the pressure in the autoclave was reduced. Then, an ethylene/propylene mixed gas prepared using 2.6 normal liters/min of ethylene and 6.0 normal liters/min of propylene was fed until the pressure in the autoclave became 0.8 MPa and thereafter the temperature in the autoclave was increased to 70° C. Subsequently, polymerization was initiated by increasing the pressure in the autoclave to 1.0 MPa. The polymerization was continued for 8 minutes while the ethylene/propylene mixed gas being fed so that the pressure in the autoclave was maintained at 1.0 MPa. Thereafter, the gaseous component was purged. After the purging, the gaseous component remaining in the autoclave was replaced by argon. 6.5 g of powder was sampled from the autoclave and then analyzed. It should be noted that the unit "normal liter" means the volume, expressed in liter, of gas at 20° C., 1 atom.

[3rd Stage]

After the sampling, the pressure in the autoclave was reduced and then an ethylene/propylene/butene mixed gas was fed until the pressure in the autoclave became 0.6 MPa. After increasing the temperature in the autoclave to 70° C., the pressure in the autoclave was adjusted to 0.8 MPa, followed by polymerization at 70° C. for 2 hours. During this operation, the ethylene/propylene/butene mixed gas was fed so that the pressure in the autoclave was maintained at 0.8 MPa. The ethylene/propylene/butene mixed gas used was prepared by adding 310 g of butene, 230 g of propylene and 220 g of ethylene into a 30-liter stainless autoclave, the inside of which had been vacuumed, and heating to 80° C. After the completion of the polymerization, the gaseous component was purged. The polymer generated was dried under reduced pressure, yielding 304 g of block copolymer powder.

The structural values of the resulting block copolymer are shown in Table 1.

[Production of Propylene-Ethylene-Butene Block Copolymer (BCPP2)]

405 grams of block copolymer powder was obtained by performing polymerization in the same manner as the production of BCPP1 except that 13.7 mg of the solid catalyst component was used and the polymerization time of the 2nd stage was 14 minutes. The structural values of the resulting block copolymer are shown in Table 1.

[Production of Propylene-Ethylene-Butene Block Copolymer (BCPP3)]

292 grams of block copolymer powder was obtained by performing polymerization in the same manner as the production of BCPP1 except that 12.4 mg of the solid catalyst component was used, the polymerization time of the 2nd stage was 12 minutes, and a gas prepared by mixing 250 g of butene, 370 g of propylene and 160 g of ethylene was used as the mixed gas of the 3rd stage. The structural values of the resulting block copolymer are shown in Table 1.

[Production of Propylene-Ethylene-Butene Block Copolymer (BCPP4)]

291 grams of block copolymer powder was obtained by performing polymerization in the same manner as the production of BCPP1 except that 9.6 mg of the solid catalyst component was used, the polymerization time of the 2nd stage was 8 minutes, polymerization was performed so that the pressure in the autoclave was maintained at 0.6 MPa, and a gas prepared by mixing 250 g of butene, 370 g of propylene and 160 g of ethylene was used as the mixed gas of the 3rd stage. The structural values of the resulting block copolymer are shown in Table 1.

[Production of Propylene-Ethylene-Butene Block Copolymer (BCPP5)]

was fed until the pressure in the autoclave became 0.6 MPa. After increasing the temperature in the autoclave to 70° C., the pressure in the autoclave was adjusted to 0.8 MPa, followed by polymerization at 70° C. for 4.5 hours. During this operation, the ethylene/propylene/butene mixed gas was fed so that the pressure in the autoclave was maintained at 0.8 MPa. The ethylene/propylene/butene mixed gas used was prepared by adding 250 g of butene, 370 g of propylene and 160 g of ethylene into a 30-liter stainless autoclave, the inside of which had been vacuumed, and heating to 80° C. After the completion of the polymerization, the gaseous component was purged. The polymer generated was dried under reduced pressure, yielding 272 g of block copolymer powder.

The structural values of the resulting block copolymer are shown in Table 1.

[Production of Propylene-Ethylene-Butene Block Copolymer (BCPP6)]

292 grams of block copolymer powder was obtained by performing polymerization in the same manner as the production of BCPP5 except that 9.9 mg of the solid catalyst component was used, the polymerization time of the 2nd stage was 2.5 hours, and a gas prepared by mixing 440 g of propylene and 230 g of ethylene was used as the mixed gas. The structural values of the resulting block copolymer are shown in Table 1.

TABLE 1

|  | BCPP1 | BCPP2 | BCPP3 | BCPP4 | BCPP5 | BCPP6 |
|---|---|---|---|---|---|---|
| MFR (g/10 min) | 16.2 | 9.8 | 11.3 | 10.3 | 7.5 | 8.5 |
| Polypropylene portion |  |  |  |  |  |  |
| Content (wt %) | 65.5 | 64.9 | 65.0 | 68.8 | 55 | 57 |
| $[\eta]_P$ (dl/g) | 1.06 | 1.04 | 1.08 | 1.10 | 1.11 | 1.07 |
| Propylene-ethylene-butene random copolymer portion |  |  |  |  |  |  |
| Content (wt %) | 34.5 | 35.1 | 35.0 | 31.2 | 45 | 43 |
| Copolymer component (EP) |  |  |  |  |  |  |
| Content (wt %) | 11.2 | 16.9 | 12.2 | 5.8 | — | 43 |
| $[\eta]_{EP}$ (dl/g) | 2.84 | 3.17 | 3.55 | 2.74 | — | 4.14 |
| $[(C'2)_{EP}]$ (wt %) | 48.5 | 44.5 | 47.9 | 54.0 | — | 42.2 |
| Copolymer component (EPB) |  |  |  |  |  |  |
| Content (wt %) | 23.3 | 18.2 | 22.8 | 25.4 | 45 | — |
| $[\eta]_{EPB}$ (dl/g) | 5.05 | 6.20 | 4.72 | 4.15 | 3.47 | — |
| $[(C'2)_{EPB}]$ (wt %) | 52.7 | 55.9 | 38.5 | 38.2 | 31.7 | — |
| $[(C'4)_{EPB}]$ (wt %) | 20.4 | 22.1 | 17.3 | 15.6 | 17.1 | — |
| $[(C'2)_{EPB}] + [(C'4)_{EPB}]$ | 73.3 | 78.0 | 55.8 | 53.8 | 48.8 | — |

[1st Stage]

Into a stainless autoclave having a capacity of 3 liters, the inside of which had been vacuumed, 4.4 mmol of triethyl aluminum, 0.44 mmol of tert-butyl-n-propyldimethoxysilane and 7.9 mg of the above-mentioned solid catalyst component were charged, and then 780 g of liquid propylene and 1.0 MPa of hydrogen were fed. Polymerization was initiated by increasing the temperature in the autoclave to 80° C. Ten minutes later, the liquid component was purged. After the purging, the gaseous component in the autoclave was replaced by argon. 5.2 g of powder was sampled from the autoclave and then analyzed.

[2nd Stage]

After the sampling, the pressure in the autoclave was reduced and then an ethylene/propylene/butene mixed gas Example 1

Production of Molded Article

Using a Labo Plastomill (produced by Toyo Seiki Seisaku-sho, Ltd.), 42.8 g of propylene-ethylene-butene block copolymer powder and 31.2 g of homopropylene having [η]=1.01 dl/g was melt-kneaded (190° C., 5 minutes). The resultant melt was hot press molded to produce a specimen, the physical properties of which were measured. The results are shown in Table 2. In the kneading, 0.05 parts by weight of calcium stearate (produced by NOF Corp.), 0.50 parts by weight of 3,9-bis[2-{3-(3-tert-butyl-4-hydroxy-5-methylphenyl)propionyloxy}-1,1-dimethylethyl]2,4,8,10-tetraoxaspiro[5.5] undecane (SUMILIZER GA80, produced by Sumitomo Chemical Co., Ltd.) and 0.50 parts by weight of bis(2,4-di-tert-butylphenyl) pentaerythritol diphosphite (ULTRANOX U626, produced by GE Specialty Chemicals) as stabilizers were added to 100 parts by weight in total of the propylene-ethylene-butene block copolymer powder and the homopropylene.

Example 2

Production of Molded Article

A specimen was produced in the same manner as Example 1 except for using 42.2 g of BCPP2 instead of 42.8 g of BCPP1 and the amount of the homopropylene having [η]=1.01 dl/g from 31.2 g to 31.8 g. The physical properties of the specimen were measured and the results are shown in Table 2.

Comparative Example 1

Production of Molded Article

A specimen was produced in the same manner as Example 1 except for using 42.3 g of BCPP3 instead of 42.8 g of BCPP1 and the amount of the homopropylene having [η]=1.01 dl/g from 31.2 g to 31.7 g. The physical properties of the specimen were measured and the results are shown in Table 2.

Comparative Example 2

Production of Molded Article

A specimen was produced in the same manner as Example 1 except for using 47.4 g of BCPP4 instead of 42.8 g of BCPP1 and the amount of the homopropylene having [η]=1.01 dl/g from 31.2 g to 26.6 g. The physical properties of the specimen were measured and the results are shown in Table 2.

Comparative Example 3

Production of Molded Article

A specimen was produced in the same manner as Example 1 except for using 32.9 g of BCPP5 instead of 42.8 g of BCPP1 and the amount of the homopropylene having [η]=1.01 dl/g from 31.2 g to 41.1 g. The physical properties of the specimen were measured and the results are shown in Table 2.

Comparative Example 4

Production of Molded Article

A specimen was produced in the same manner as Example 1 except for using 34.4 g of BCPP6 instead of 42.8 g of BCPP1 and the amount of the homopropylene having [η]=1.01 dl/g from 31.2 g to 39.6 g. The physical properties of the specimen were measured and the results are shown in Table 2.

TABLE 2

| | Example | | Comparative Example | | | |
|---|---|---|---|---|---|---|
| | 1 | 2 | 1 | 2 | 3 | 4 |
| MFR (g/10 min) | 30.9 | 23.5 | 25.4 | 21.0 | 27.0 | 27.2 |
| FM (MPa) | 1063 | 996 | 988 | 869 | 908 | 1051 |
| IZOD impact strength (kJ/m$^2$) | | | | | | |
| 23° C. | 7.4 | 11.2 | 11.4 | 9.9 | 6.1 | 7.6 |
| −30° C. | 3.7 | 4.0 | 3.0 | 2.3 | 1.4 | 2.9 |

The experimental results provided in Table 2 show that the propylene-ethylene-butene block copolymers of Examples 1 and 2 are superior in stiffness and impact strength to the copolymers of Comparative Examples 1 to 4.

INDUSTRIAL APPLICABILITY

The propylene-ethylene-butene block copolymer of the present invention can be fabricated into molded articles by appropriate molding techniques. It is particularly suitable for injection molding. Molded articles containing the propylene-ethylene-butene block copolymer of the present invention excels in stiffness and impact resistance. Therefore, injection molded articles obtained from the propylene-ethylene-butene block copolymer of the present invention are suitable as automotive components, such as door trims, pillars, instrument panels and bumpers.

The invention claimed is:

1. A propylene-ethylene-butene block copolymer comprising from 60 to 85% by weight, based on the whole amount of the propylene-ethylene-butene block copolymer, of a polypropylene portion which is a propylene homopolymer or a copolymer of propylene with 1 mol % or less of at least one comonomer selected from the group consisting of ethylene and α-olefins having 4 or more carbon atoms, and from 15 to 40% by weight, based on the whole amount of the propylene-ethylene-butene block copolymer, of a propylene-ethylene-butene random copolymer portion having a weight ratio of propylene units to ethylene units is from 35/65 to 75/25, wherein the propylene-ethylene-butene block copolymer satisfies the requirements (1) and (2) provided below:
   requirement (1): the propylene-ethylene-butene random copolymer portion comprises a propylene-ethylene random copolymer component (EP) and a propylene-ethylene-butene random copolymer component (EPB), the copolymer component (EP) having an intrinsic viscosity $[\eta]_{EP}$ of from 1.5 to 8 dl/g and an ethylene unit content $[(C2')_{EP}]$ of from 20 to 50% by weight, and the copolymer component (EPB) having an intrinsic viscosity $[\eta]_{EPB}$ of from 0.5 to 8 dl/g, an ethylene unit content $[(C2')_{EPB}]$ of from 47 to 77% by weight, a butene unit component $[(C'4)_{EPB}]$ of from 3 to 33% by weight, and a total of the ethylene unit content $[(C'2)_{EPB}]$ and the butene unit content $[(C4')_{EPB}]$ being from 50 to 80% by weight;
   requirement (2): the propylene-ethylene-butene block copolymer has a melt flow rate of from 5 to 120 g/10 min.

2. The propylene-ethylene-butene block copolymer according to claim 1, wherein the ethylene content $[(C2')_{EP}]$ is from 25 to 45% by weight and the ethylene content $[(C2')_{EPB}]$ of from 52 to 72% by weight.

3. The propylene-ethylene-butene block copolymer according to claim 1, wherein the intrinsic viscosity $[\eta]_{EP}$ and the intrinsic viscosity $[\eta]_{EPB}$ satisfy a relationship $[\eta]_{EP} \geqq [\eta]_{EPB}$.

4. The propylene-ethylene-butene block copolymer according to claim 1, wherein the polypropylene portion has an intrinsic viscosity $[\eta]_P$ of 1.5 dl/g or less and a molecular weight distribution, as measured by gel permeation chromatography, of not less than 3 but less than 7.

5. A molded article comprising the propylene-ethylene-butene block copolymer according to any one of claims 1 to 4.

* * * * *